United States Patent [19]

Crombie et al.

[11] Patent Number: 4,672,888
[45] Date of Patent: Jun. 16, 1987

[54] INFLATABLE GREENHOUSE VENT COVER

[75] Inventors: Terence G. Crombie, Northfield; Bernard K. Wong, Edina, both of Minn.

[73] Assignee: Insul-Rib, Inc., Castle Rock, Minn.

[21] Appl. No.: 688,465

[22] Filed: Jan. 3, 1985

[51] Int. Cl.$^4$ .............................................. F24F 13/10
[52] U.S. Cl. .................................... 98/29; 47/17; 52/2; 52/303; 98/32; 98/37; 98/41.3; 137/360; 251/61.1
[58] Field of Search ............. 47/17; 52/2, 2 C, 2 H, 52/2 J, 302, 303; 98/29, 32, 37, 41.1, 41.3, 42.01; 251/61.1; 137/357, 360

[56] References Cited

U.S. PATENT DOCUMENTS

| | | | |
|---|---|---|---|
| 2,354,795 | 8/1944 | Castle | 98/37 |
| 3,151,663 | 10/1964 | Bohner et al. | 52/2 |
| 3,359,687 | 12/1967 | Wallace | 49/477 |
| 3,804,364 | 4/1974 | DeLepeleire | 251/61 X |
| 3,938,429 | 2/1976 | Perry | 98/37 |
| 3,973,363 | 8/1976 | LaPorte et al. | 52/2 |
| 4,038,788 | 8/1977 | Claessens | 52/2 |
| 4,290,242 | 9/1981 | Gregory, Jr. | 52/2 |
| 4,293,969 | 10/1981 | Frommelt | 52/2 X |
| 4,297,813 | 11/1981 | Farrell et al. | 52/2 |
| 4,301,626 | 11/1981 | Davis et al. | 52/2 |
| 4,305,235 | 12/1981 | Roston | 52/2 |
| 4,318,251 | 3/1982 | Winkler | 52/2 |
| 4,352,259 | 10/1982 | Smith et al. | 52/2 |
| 4,399,738 | 8/1983 | Sharkey | 98/32 |

FOREIGN PATENT DOCUMENTS 1551869  1/1969  France ......................... 52/2

Primary Examiner—Harold Joyce
Attorney, Agent, or Firm—J. W. Gipple

[57] ABSTRACT

Expandable vent closure apparatus for a greenhouse comprising a clear inflatable mat, the opposed surfaces of which are sealed to one another to form a plurality of horizontal tubular members and a plurality of internal air passages connecting one to the other. Air means connected to the uppermost tubular section inflates the mat within a wall mounted support assembly from the top down to seal the vent opening or upon deflation to open the vent.

10 Claims, 5 Drawing Figures

INFLATABLE GREENHOUSE VENT COVER

BACKGROUND OF THE INVENTION

The present invention relates to greenhouse vent systems and in particular to a wall mounted, inflatable vent cover assemby including a top inflated, clear polymer mat having a plurality of horizontally formed tubular sections and a plurality of internal air passages opening therebetween.

In order to achieve optimum growing conditions in a greenhouse, a variety of systems are oftentimes included therein for controlling the ambient temperature, humidity, lighting, and availability of plant nutrients, such as water and fertilizers, to name but a few of the commonly encountered control systems. The present invention relates to one of such systems and is particularly related to the vent system that typically is included in all greenhouse structures for controllably exposing the greenhouse interior to outside air via a plurality of covered openings thereto. Typically the vent system comprises a plurality of operating window or wall sections that can be opened and closed as desired. It is in this regard, therefore, that the present invention contemplates a cover assembly for sealably permitting the closure and opening of such vent openings by inflating or deflating a horizontal multi-sectioned tubular mat assembly mounted exteriorly or interiorly of the greenhouse, adjacent the vent opening.

Previously, a number of mat-like or inflatable partition assemblies have been developed for controlling the interior space of a greenhouse. Some of these assemblies mount in overlying relation to the plants and extend across the ceiling of the greenhouse at various heights so as to provide an overlying insulative cover and/or minimize the air space to be heated. Examples of such assemblies can be seen upon directing attention to U.S. Pat. Nos. 4,038,788; 4,290,242; 4,297,813; 4,301,626; 4,305,235; 4,318,251; and 4,352,259. The partitions described in the foregoing patents, however, are not intended for controlling vent air to the greenhouse interior.

To the extent that vent closure systems have been developed, they typically comprise a rigid wall or window section that can be pivoted outwardly from the greenhouse a desired distance relative to an externally mounted rack assembly so as to admit air thereto. Examples of some of a number of available rigid vent closure systems can be seen upon directing attention to the sales literature of various manufacturers such as Stuppys of Kansas City, Mo.; Frank Yonkman and Sons, Ltd., Bradford, Ontario, Canada and X.S. Smith Inc., Eatontown, N.J., among others. However, because of the amount of venting typically required and which vents commonly extend for hundreds of feet and comprise thousands of square feet of wall or roof space, such systems become very complex and expensive on a cost per foot basis.

Yet another vent closure system that Applicant is aware of is disclosed in U.S. Pat. No. 4,399,738. This system comprises an inflatable tubular member that is fixedly mounted in relation to a cable extending lengthwise along a vent opening. The cable supports the inflatable tubular member and the member upon inflation expands to seal the vent opening. However, due to the use of a single tubular member, a great deal of space is occupied by the inflated structure, either interiorly or exteriorly of the greenhouse. Further, a relatively complex and cumbersome housing is required for containing the tubular member relative to the vent opening. Thus, while an alternative arrangement to a rigid system is described therein, it is not believed to be as cost effective or as space efficient as the present assembly.

The above objects, advantages, and distinctions of the present invention, as well as its construction, will, however, become more apparent upon directing attention to the following description thereof with respect to the appended drawings. Before referring thereto, however, it is to be recognized that the following description is made with respect to the presently preferred embodiment only and therefore it should not in any way be interpreted as self limiting.

SUMMARY OF THE INVENTION

A greenhouse vent closure system mountable to the exterior or interior wall of a greenhouse, adjacent to a vent opening, and including a multi-tubular mat member expandably mounted relative thereto for sealing or opening the vent opening upon inflating or deflating of the mat. A wall mounted frame assembly comprising upper and lower drain containing support members and including a plurality of vertical support ribs transversely spaced therealong confine the mat movement relative to the vent opening.

The inflatable mat is comprised of a clear polymer air mat sealed at its lateral edges and including a plurality of horizontally lengthwise extending, tubular sections and having a plurality of internal air passages opening therebetween. Inflating means coupled to the uppermost horizontal tubular section causes the mat to inflate from the top, down as it is raised or lowered in relation to the vent opening. In an alternative embodiment, grommets mounted at the lateral edges of the tubular sections and a cable vertically stretched therethrough ensure against movement of the mat ends relative to the frame with varying wind loads.

DESCRIPTION OF THE PREFERRED EMBODIMENT

Figure 1:
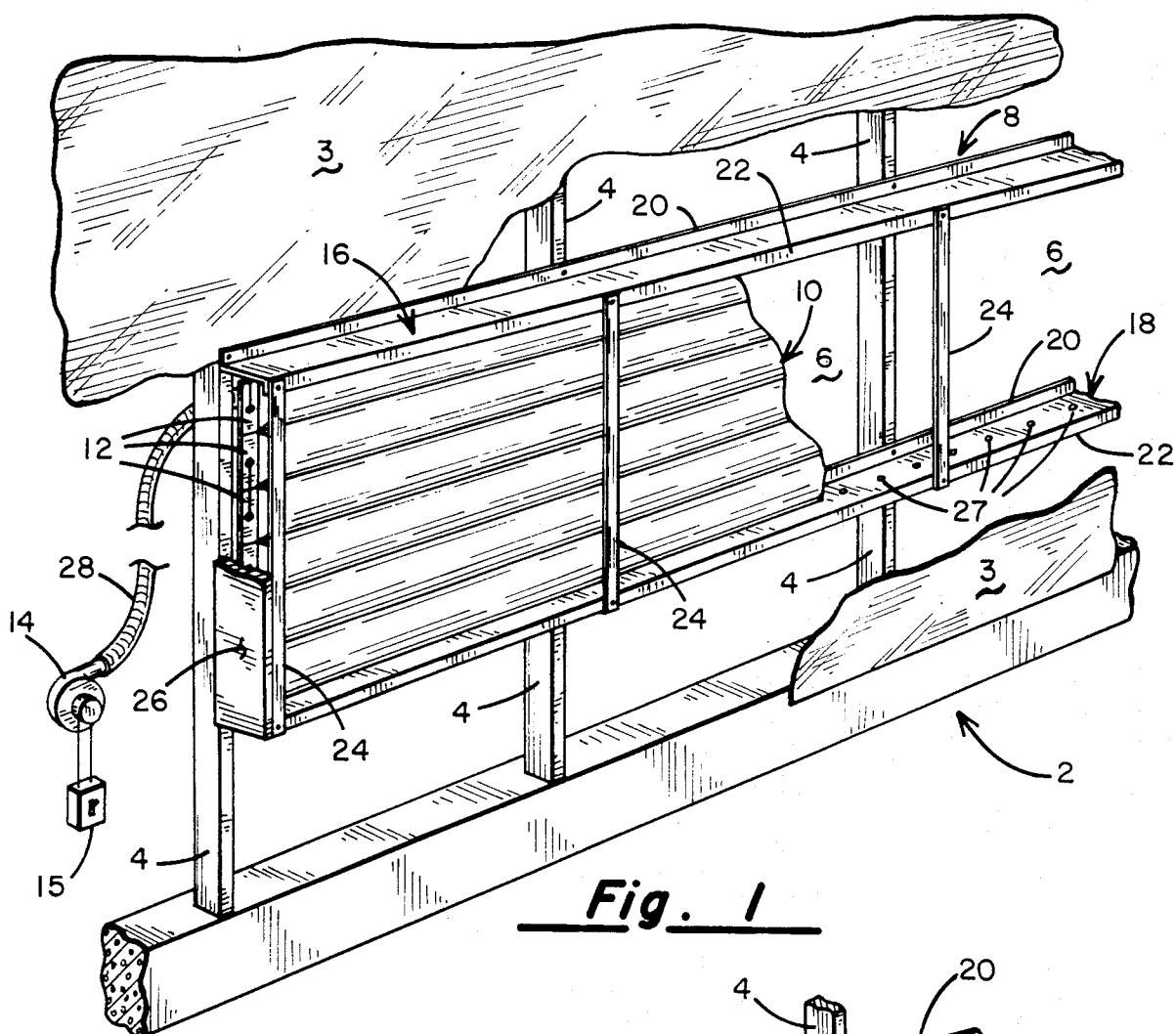
FIG. 1 shows a partially sectioned perspective assembly view of a section of the present vent system in its inflated condition relative to a section of a greenhouse wall.

Referring to FIG. 1, a partially sectioned perspective assembly view is shown of the present vent system 2 in inflated relation to a vent opening 6 provided in the typical greenhouse construction. As shown, the present vent system 2 is shown being mounted to the exterior glazed frame walls 3 of a typical greenhouse and, in particular, at the frame members 4 in adjacent covering relation to the vent openings 6 provided in the greenhouse wall 3. Depending on the size of the greenhouse and the amount of venting required, the height of the openings 6 and the length thereof are accordingly adjusted to provide sufficient venting to the greenhouse interior. For example, the height of most vents are sized to be within a range of three to five feet tall and can extend for hundreds of feet along one or more walls or for that matter the roof of the greenhouse.

The construction of the present vent system 2 is principally comprised of an external support assembly 8 made either of wood, galvanized sheet metal, aluminum or other weather resistant materials, that mounts to the greenhouse wall and within the interior of which is mounted an inflatable mat 10 having a plurality of horizontally extending tubular sections 12 formed one above the other and which mat 10 is inflated from the top down via an appurtenant air pump 14 and power switch 15. The support assembly 8 is comprised of upper and lower horizontally extending channel members 16 and 18 that mount to the frame members 4 via associated flanged portions 20. The upper and lower channel members 16 and 18 extend away from the greenhouse wall approximately six inches and at which point a further flange 22 is formed lengthwise therealong and to which flanges 22, a plurality of vertical supports 24 are transversely mounted at a spacing sufficient to accommodate typically encountered wind loads (i.e. 3 to 6 feet apart). Specifically, depending upon the prevailing wind conditions, the vertical members 24 are mounted either closer or farther apart from one another so as to prevent against the sagging of the mat 10 inwardly or outwardly with varying wind loads. The support assembly 8 thus constrains the expansion of the mat 10 along a vertical axis parallel to the greenhouse wall 3 between the frame members 4 and vertical supports 24 and when fully inflated, the inflated mat 10 operates to seal the vent openings 6 between the upper and lower channel supports 16 and 18. Air infiltration around the ends is also minimized via end caps 26. Drain holes 27 in the support member 18 also drain off any water collecting therein.

Figure 2:
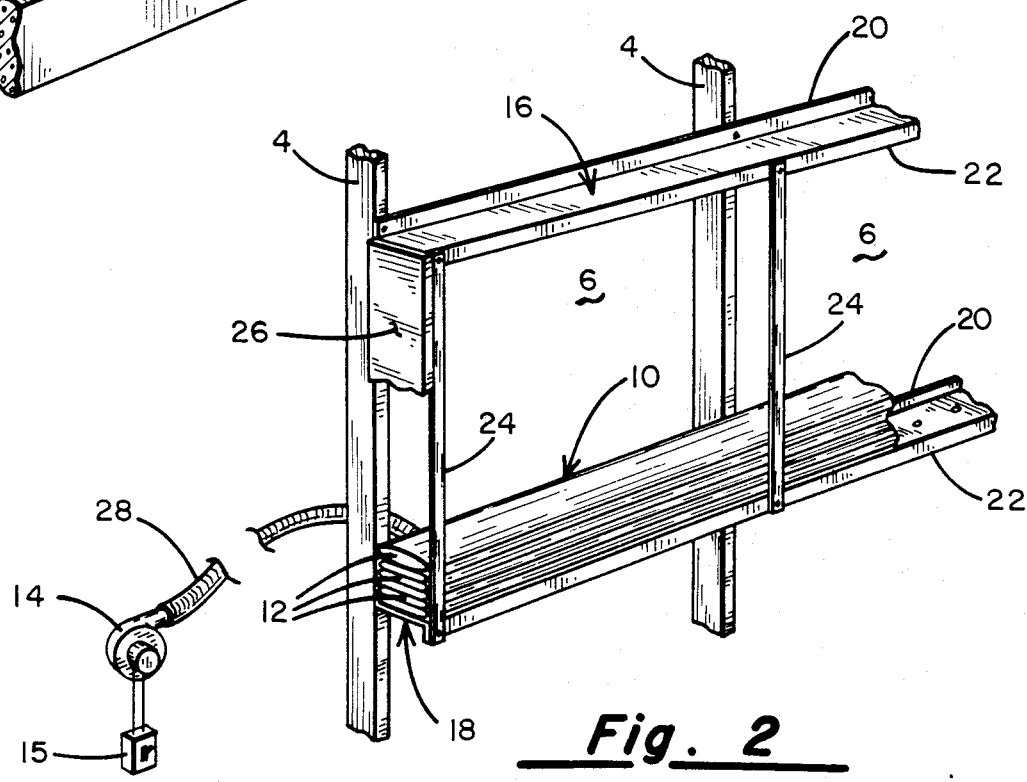
FIG. 2 shows a perspective assembly view of a portion of the present vent system in its deflated condition.

While FIG. 1 shows the present vent system 2 in its inflated condition relative to the vent openings 6, attention is also directed to FIG. 2 and wherein a partially sectioned perspective view is shown of the vent system 2 in its deflated condition. Relative to FIG. 2, it is to be noted that upon being deflated, the tubular sections 12 of the mat 10 collapse along the length of the support assembly 8 in an accordion fashion so as to expose the openings 6, In this condition, too, the manifold 28 extending from the blower 14 has again followed the tubular section so that it extends downwardly, whereas in FIG. 1 it extended upwardly. At this point, it should be noted too that by varying the size of the blower 14 and/or using multiple blowers 14, the rate at which the mat 10 is inflated can be adjusted accordingly. For the presently preferred embodiment, however, it has been found that a 100 cubic feet per minute blower 14 is sufficient to accommodate most applications and mat lengths of up to 200 feet and widths of up to five feet. In selecting the blower 14, concern must however be had to ensure that it is not oversized so as to overpressurize and burst the mat 10. For the presently preferred embodiment, a static mat pressure in the range of 0.5 to 1 mmHg is sufficient to maintain the mat 10 in its inflated condition without bursting. Depending too upon the type and thickness of the mat material, this pressure may be adjusted. For the present embodiment, though, a 6 mil polyethylene material is used in the mat 10.

Figure 3:
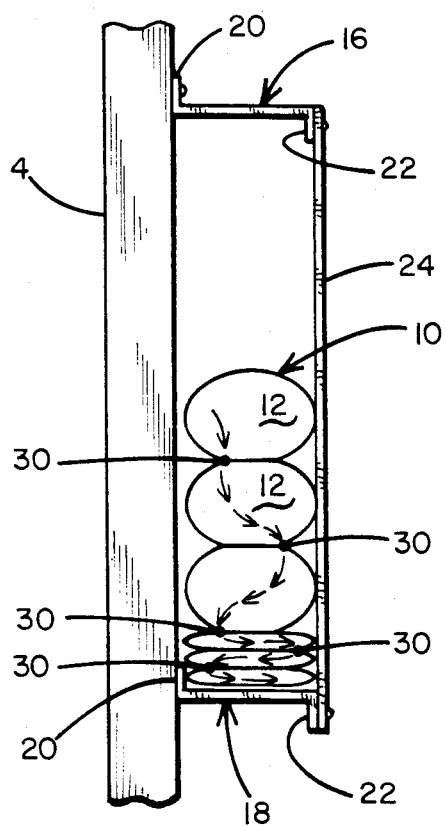
FIG. 3 shows an end cross-section view of the inflatable mat and support assembly.

Directing attention now to FIG. 3, a cross-sectioned view is shown through the mat 10 in a partially inflated condition. From this figure, a view can also be had as to the downward air flow through the mat 10 relative to the pinch seals 30 that occur at the intersections of each of the tubular sections 12. In particular, as the air is admitted to the uppermost tubular section 12, it causes its lengthwise inflation and an increase in the internal pressure so as to force air between a number of lengthwise seals 30 spaced along the tubular section 12. This then causes the next lower tubular section 12 to fill and so on until all of the tubular sections 12 have been inflated. Deflation occurs in a reverse fashion via the operation of the blower 14 in a reverse mode or the disconnection of the manifold 28 and which causes the air to escape from the mat 10.

Figure 4:
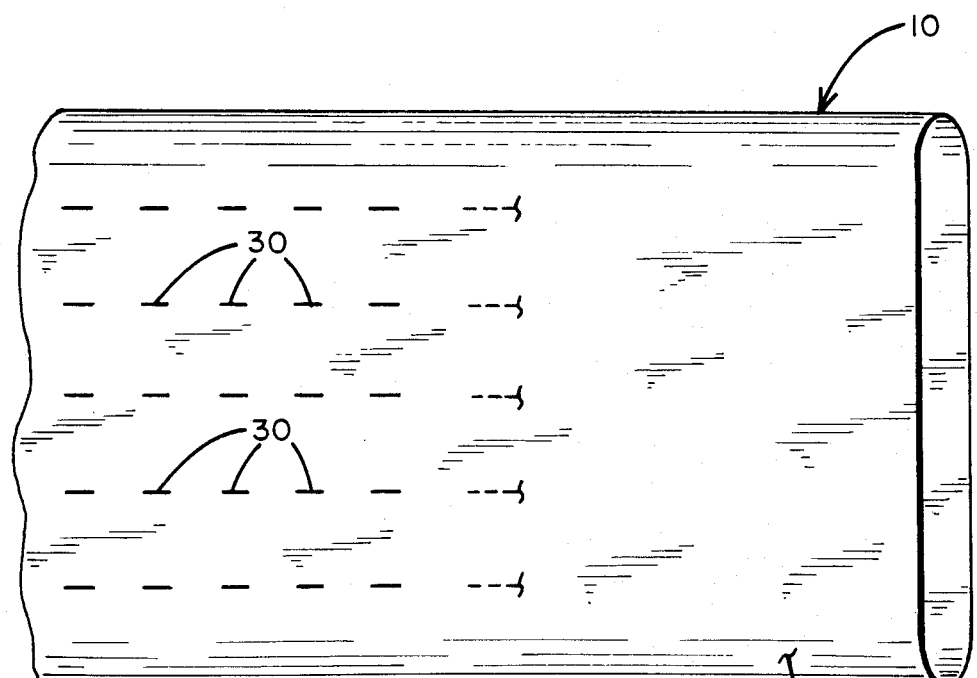
FIG. 4 shows a diagramatic representation of the sealing of the lay flat tube.

Relative to the spot seals 30, attention is next directed to FIG. 4 and wherein a diagramatic view is shown of the placement of these seals 30 in between each tubular section 12 and their transverse spacing from one another therealong. During the fabrication of the mat 10 and tubular sections 12, a length of tubular material 32 is fed through appropriate sealing equipment to completely seal each of the horizontal lengthwise ends of the mat 10 and to incrementally spot seal the stock 32 so as to form a plurality of horizontal rows. The seals 30 are vertically spaced apart from one another a distance sufficient to accommodate the height desired for each tubular section 12. In lieu of forming a continuous seal between each tubular section 12, the tubular stock 32 is incrementally sealed in a lengthwise fashion, with each spot seal 30 along each horizontal row being separated from the other at a distance slightly less than that of the vertical distance between rows. For example, in the presently preferred embodiment, each horizontal row of spot seals 30 is typically ten inches apart and the spacing between spot seals is six inches, while the spot seals 30 are typically one and one-quarter inches long.

It is to be recognized that in its inflated condition, the mat 10 is not as tall as the flat tubular stock 32, due to the outward expansion of each tubular section during inflation. Thus, for example, for an 80 inch high flat stock at the foregoing spot seal 30 spacings, the mat 10 inflates to approximately 48 inches in height and which in combination with the support structure 8 accommodates a 36 inch high opening 6. Similarly, a 100 inch flat stock inflates to 60 inches and accommodates a 48 inch high opening 6.

From FIG. 3, it is also to be noted that once the mat 10 has been inflated, the tubular sections 12 tend to re-align relative to each other. That is, the spot seals 30 shift away from center when viewed on edge in an alternating fashion with resultant tucks forming therebetween and which tucks facilitate the stacking of the sections 12.

Figure 5:
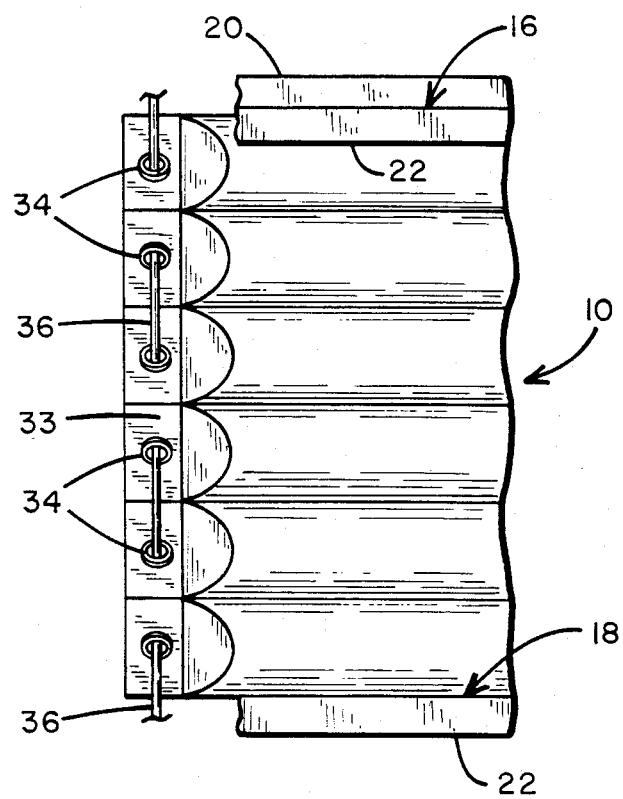
FIG. 5 shows a view of one end of mat for an alternative embodiment used in locations susceptible to high winds.

Returning attention to FIG. 1, the tubular sections 12 have been shown in friction fit relation to the end caps 26. In various embodiments, however, additional steps must be taken in order to prevent against possible wind gusts from forcing the lateral ends of the mat 10 inwardly and out of their mounting relation to the end caps 26. FIG. 5 shows one such alternative embodiment of the mat 10. Specifically, FIG. 5 shows a mat 10 wherein one of its vertical edges is sealed in a continuous fashion for approximately two inches and to which sealed portion 33, a plurality of grommets 34 are mounted in threaded relation to a cable 36 extending between the upper and lower support members 16 and 18 (not shown). Thus, upon inflating the mat 10, its movement is constrained not only by the vertical support members 24 but also by the cables 36.

At this point, too, it is to be noted that a variety of different latch assemblies could be mounted along the uppermost tubular section 12 to engage with mating latch portions at the upper support 16. In this fashion, upon encountering power failures, the mat 10 would not unintentionally deflate and expose the vent openings 6. For example, magnetic or a variety of mechanical latches might be used. Such mechanisms are not shown for the present embodiment, only because most greenhouses have backup power systems and which would come on-line before a sufficient amount of time had elapsed to permit the mat 10 to collapse. Typically, it taking upwards of 15 to 30 minutes for the mat 10 to collapse for lengths of 200 feet.

While the present invention has been described with respect to its presently preferred embodiment and various modifications thereto, it is to be recognized that still other modifications might suggest themselves to those of skill in the art. Accordingly, it is contemplated that the following claims should be interpreted so as to include all those equivalent embodiments within the spirit and scope of the aforesaid invention.

What is claimed is:

1. A vent closure system for providing outside ventilation to the interior of a building comprising in combination:
   (a) a hollow sealed mat having a plurality of horizontal tubular sections formed adjacent to one another and incrementally sealed together by spot seals disposed between the length of each section on alternating sides of the longitudinal axis of each section, and including a plurality of air passages opening internally between each of said spot seals;
   (b) means for inflating and deflating mat; and
   (c) means mountable to an outside wall of said building adjacent a vent opening for supporting said mat in covering relation thereto when inflated and in uncovered relation when deflated.

2. Apparatus as set forth in claim 1 wherein said support means comprises upper and lower channel members, a plurality of vertical support members transversely spaced apart from one another between said upper and lower support channels and first and second end caps mounted to the lateral ends of said support assembly.

3. Apparatus as set forth in claim 2 wherein at least the lower one of said support channels includes a plurality of drain holes formed therethrough.

4. Apparatus as set forth in claim 1 wherein said mat includes at least one sealed portion extending across said mat orthogonal to said horizontal tubular sections and having a plurality of grommets mounted therein and a cable member threadably extending through said grommets.

5. Apparatus as set forth in claim 1 wherein said inflation means is coupled to the uppermost one of said tubular sections for inflating said mat in a top, down fashion.

6. The system of claim 1 wherein said building is a greenhouse.

7. The system of claim 1 wherein said outside wall is substantially vertical.

8. The system of claim 1 wherein wind support means are vertically disposed on the interior of said building to support said mat against externally applied forces.

9. The system of claim 8 wherein said wind support means are disposed in spaced relationship to one another between said mounting means.

10. A vent closure system for providing outside ventilation to the interior of a building comprising in combination:
   (a) a hollow sealed mat having a plurality of horizontal tubular sections formed in a vertical plane, one above the other and incrementally sealed together by spot seals disposed between the length of each section on alternating sides of the longitudinal axis of each section, and including a plurality of air passages opening internally between each of said spot seals;
   (b) means coupled to the uppermost one of said tubular sections for inflating and deflating said mat in a top, down fashion; and
   (c) support means mountable to an outside vertical wall of said building adjacent a vent opening including upper and lower channel members, said lower channel member having a plurality of drain holes, and a plurality of vertical support members transversely spaced apart from one another between said upper and lower support channels and first and second end caps mounted to the lateral ends of said support assembly for supporting said mat in covering relation thereto when inflated and in uncovered relation when deflated;
   (d) vertical wind support means spaced apart from one another between said upper and lower channel members on the interior side of said mat for providing support thereto against externally applied forces.

* * * * *